United States Patent
Sengupta et al.

(10) Patent No.: US 9,763,072 B2
(45) Date of Patent: Sep. 12, 2017

(54) MOBILE-TERMINATED EMERGENCY CALL

(71) Applicant: Intel Corporation, Santa Clara, CA (US)

(72) Inventors: Saikat Sengupta, Bangalore (IN); Harish Mitty, Bangalore (IN); Somashekhar Rudrakshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/359,880

(22) PCT Filed: Dec. 17, 2013

(86) PCT No.: PCT/US2013/075793
§ 371 (c)(1),
(2) Date: May 21, 2014

(87) PCT Pub. No.: WO2015/094186
PCT Pub. Date: Jun. 25, 2015

(65) Prior Publication Data
US 2015/0172895 A1 Jun. 18, 2015

(51) Int. Cl.
*H04W 4/22* (2009.01)
*H04W 4/02* (2009.01)
(Continued)

(52) U.S. Cl.
CPC ............ *H04W 4/22* (2013.01); *H04W 4/021* (2013.01); *H04W 8/06* (2013.01); *H04W 60/00* (2013.01);
(Continued)

(58) Field of Classification Search
CPC ....... H04W 60/00; H04W 68/00; H04W 4/22; H04W 4/021; H04W 8/06; H04W 68/005; H04W 76/007
See application file for complete search history.

(56) References Cited

U.S. PATENT DOCUMENTS

2004/0072578 A1* 4/2004 Keutmann ............. H04W 8/20
455/456.1
2004/0203572 A1 10/2004 Aerrabotu et al.
(Continued)

FOREIGN PATENT DOCUMENTS

| GB | 2440576 A | 2/2008 |
|---|---|---|
| WO | WO 2008/052744 A2 | 5/2008 |
| WO | 2012/154337 A1 | 11/2012 |

OTHER PUBLICATIONS

3GPP, "Technical Specification Group Core Network and Terminals; Mobile radio interface Layer 3 specification; Core network protocols; Stage 3 (Release 12)," 3GPP TS 24.008 V12.3.0 (Sep. 2013), Sep. 20, 2013, Lte Advanced, 683 pages.
(Continued)

*Primary Examiner* — Marcos Torres
(74) *Attorney, Agent, or Firm* — Schwabe, Williamson & Wyatt, P.C.

(57) ABSTRACT

Embodiments described herein relate generally to a user equipment ("UE") that is to receive emergency communication. The UE may be camped with limited service on a wireless network that is associated with a visited mobile switching circuit ("MSC"). While camped in limited service, the UE may transmit a location update request to the visited MSC that indicates the UE is to receive emergency communication while camped with limited service on the wireless network. Accordingly, the visited MSC may update a visitor location registry and a home location registry. Thereafter, when an emergency service attempts to contact the
(Continued)

UE, the UE may be reached even while camped with limited service.

23 Claims, 7 Drawing Sheets

(51) Int. Cl.
*H04W 8/06* (2009.01)
*H04W 60/00* (2009.01)
*H04W 68/00* (2009.01)
*H04W 76/00* (2009.01)

(52) U.S. Cl.
CPC ........ *H04W 68/005* (2013.01); *H04W 76/007* (2013.01)

(56) References Cited

U.S. PATENT DOCUMENTS

| | | |
|---|---|---|
| 2006/0291641 A1 | 12/2006 | Barclay et al. |
| 2008/0233931 A1 | 9/2008 | Shim |
| 2010/0130159 A1* | 5/2010 | Wu .................. H04M 3/229 455/404.1 |
| 2011/0096769 A1 | 4/2011 | Sim |
| 2012/0218889 A1 | 8/2012 | Watfa et al. |
| 2013/0185151 A1* | 7/2013 | Mogalapalli .......... G06Q 30/02 705/14.49 |

OTHER PUBLICATIONS

3GPP, "Technical Specification Group Radio Access Network; Radio Resource Control (RRC); Protocol specification (Release 11)," 3GPP TS 25.331 V11.7.0 (Sep. 2013), Sep. 19, 2013, 2,085 pages.

3GPP, "Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11)," 3GPP TS 44.060 V11.6.0 (Sep. 2013), Sep. 23, 2013, GSM Global System for Mobile Communications, 630 pages.

International Search Report and Written Opinion mailed Sep. 29, 2014 from International Application No. PCT/US2013/075793.

Partial Supplementary European Search Report dated Jun. 22, 2017 from European Patent Application No. 13899499.1, 17 pages.

* cited by examiner though the UE may have the capability to operate on wireless
MOBILE-TERMINATED EMERGENCY CALL

CROSS REFERENCE TO RELATED APPLICATIONS

The present application is a national phase entry under 35 U.S.C. §371 of International Application No. PCT/US2013/075793, filed Dec. 17, 2013, entitled "MOBILE-TERMINATED EMERGENCY CALL", which designates the United States of America, the entire disclosure of which is hereby incorporated by reference in its entirety.

FIELD OF INVENTION

Embodiments of the present invention relate generally to the technical field of data processing, and more particularly, to wireless networks provided by cells to user equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

Currently, wireless networks do not offer comprehensive coverage of all geographic locations. That is, wireless network coverage offered by a first service provider may be absent in one location while a second service provider may feature wireless network coverage in that same location, and vice versa for a different location. While a user equipment ("UE") may have the capability to operate on wireless networks provided by both the first and second service providers, the UE may only subscribe to the first service provider. Therefore, absent a roaming agreement between the two service providers, the UE is forbidden from receiving mobile-terminated conversational calls through the wireless network of the second service provider. In areas where only the second service provider offers wireless coverage, the UE may camp on the forbidden network of the second service provider, but only with limited service. Because the UE is operating with limited service on the forbidden network, the UE will be unable to receive mobile-terminated conversational calls.

The inability to establish a mobile-terminated conversational call with a UE that is camped on a forbidden network is especially problematic when emergency services need to reach the UE. The UE may still be able to receive paging messages that are transmitted within a cell, and so may be alerted to generic paging messages used for Earthquake and Tsunami Warning System ("ETWS") messages. However, the UE may be unable to receive individual communications from emergency services.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A" or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Embodiments described herein relate generally to a user equipment ("UE") that is to receive emergency communication while camped on a wireless network with limited service. The approach described herein may remove restrictions related to conversation calls that are necessary for emergency communication and may provide a plurality of benefits, including tracking of UEs based only on a Mobile Subscriber Integrated Services Digital Network-Number ("MSISDN") of the UE. Additionally, this approach described herein may be extended to allow users to receive emergency communication while camped with limited service, such as through an optional and/or value-added service. This approach may be implemented without significant changes to user equipment and core networks.

Figure 1:
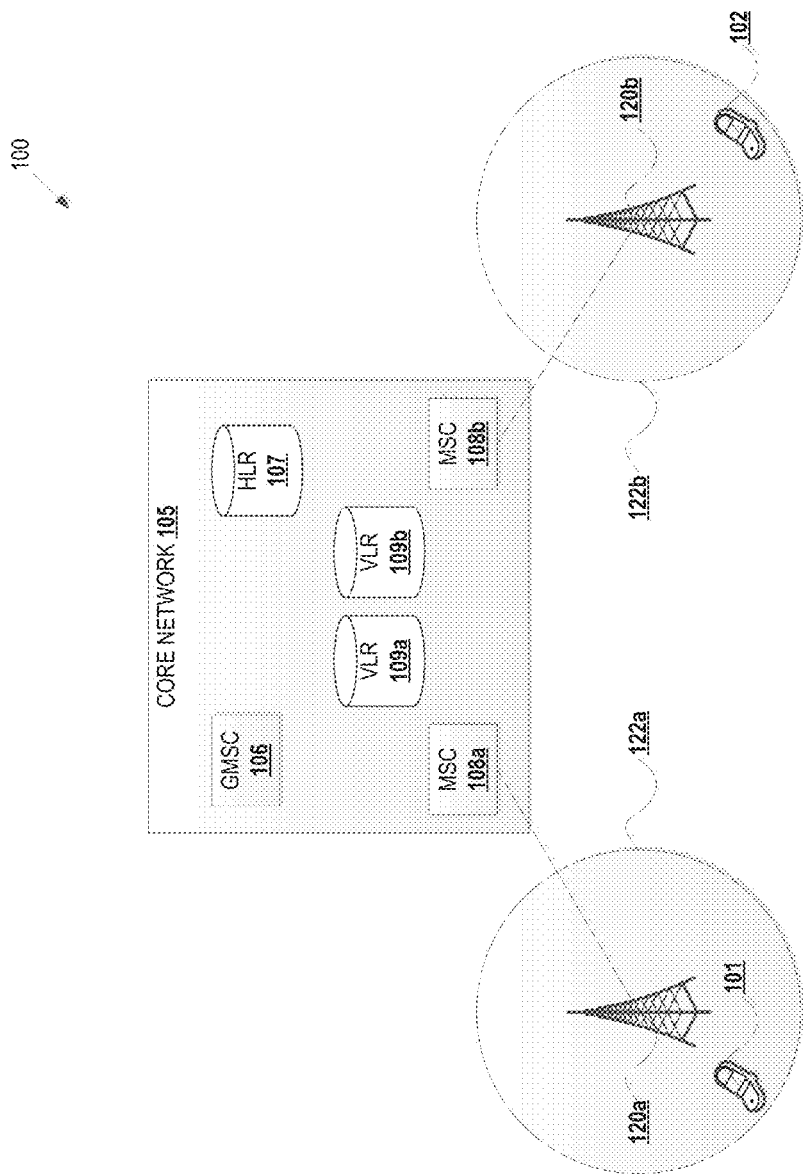
FIG. 1 is an exemplary wireless communication network illustrating a UE that is camped with limited service on a wireless network, in accordance with various embodiments.

FIG. 1 illustrates an exemplary network environment 100, according to one embodiment. The network environment 100 may include a core network 105 that may be managed by a service provider. The core network 105 may be adapted to provide communication services to its subscribers. In connection with such services, the core network 105 interfaces with external networks, such as the public switched telephone network and other core networks (not shown) that may be functionally equivalent to the core network 105. Accordingly, conversational calls may be established across discrete networks.

Among other components, a core network 105 may include, for example, a gateway mobile switching center ("GMSC") 106, a home location register ("HLR") 107, a plurality of mobile switching centers ("MSCs") 108a-b, and a plurality of visitor location registers ("VLRs") 109a-b. The GMSC 106 may interface with external networks, for example, to attempt to establish conversational calls between two discrete networks. The HLR 107 may be a database that includes information related to subscribers authorized to communicate through the core network 105. An MSC 108 may manage certain communications, such as conversational calls, and therefore may set up and release end-to-end connections through a wireless network that connects a user equipment ("UE") to the core network 105. Finally, a VLR 109 may be a database that includes information related to UEs that are currently within an area controlled by an MSC (e.g., an area covered by a plurality of base transceiver stations that are controlled by an MSC).

Components 106-109 included in the core network 105 may be coupled with one another so that data may be communicated—for example, the VLR 109 may provide information related to a UE to the HLR 107. One or more components 106-109 also may be physically and/or logically integrated—for example, the VLR 109a may be integrated with the MSC 108a. Additionally, the core network 105 may include other components that are not shown and/or are functionally similar to the illustrated components 106-109.

In various embodiments, an MSC 108 controls at least one base transceiver station ("BTS") 120. In various embodiments, a BTS 120 may be, for example, a node B, and evolved Node B, or other equipment that facilitates wireless communication between a UE and a network. Although not shown herein, one of ordinary skill would appreciate that one or more additional components may facilitate interaction between an MSC 108 and an BTS 120, such as a mobility management entity, radio network controller, and/or a serving gateway. An BTS 120 may provide a cell 122 of a wireless network to allow UEs 101, 102 to access the core network 105. A wireless network comprised of cells 122 may be an access network of a 3rd Generation Partnership Project ("3GPP") long-term evolution ("LTE") network such as evolved universal mobile telecommunication system ("UMTS") terrestrial radio access network ("E-UTRAN"). As illustrated herein, the MSC 108a controls the BTS 120a and the MSC 108b controls the BTS 120b; however, each MSC 108 may be adapted to control a plurality of BTSs.

A UE 101, 102 may operate on a wireless cell 122 provided by an BTS 120. As illustrated herein, a first UE 101 camps on a first wireless cell 122a while a second UE 102 camps on a second wireless cell 122b. In various embodiments, the first UE 101 may not be a subscriber of the core network 105 and, therefore, may not avail itself of all services provided the core network 105, such as, for example, conversational calls. Rather, the first UE 101 may be a subscriber of another core network (not shown) that is similar to the core network 105 (e.g., a core network that includes a GMSC, HLR, and various other components). Absent a roaming agreement, the first wireless cell 122a is included in a forbidden network for the first UE 101 and, consequently, the first UE 101 may only camp on the first wireless cell 122a with limited service. In particular, the first UE 101 may not be able to receive mobile-terminated conversational calls. In contrast, the second UE 102 may camp on the second wireless cell 122b with full service (e.g., the second UE 102 may be a subscriber of the core network 105). Accordingly, the second UE 102 may place mobile-originated and receive mobile-terminated conversational calls. In various embodiments, the second UE 102 may be associated with an emergency service that is at least one of a police force, a firefighting force, and an emergency medical treatment force. In another embodiment, the second UE 102 may be associated with a second subscriber that is authorized to establish a communication with the first UE 101, such as where the second subscriber subscribes to a value-added service that allows for such communication. The second UE 102 may be identified as associated with an emergency service or other subscriber authorized to communicate with the first UE 101 based on inclusion of an identification of the second UE 102 in an emergency communication list. The emergency communication list may be a stored list of identifications of UEs that are authorized to establish conversational calls with UEs that are camped on a wireless cell 122 with limited service. For example, the emergency communication list may be a list of Mobile Subscriber Integrated Services Digital Network-Numbers ("MSISDNs"). This emergency communication list may be accessible by an MSC 108a so that the first UE 101 may receive a mobile-terminated emergency call from the emergency services UE 102 even where the first UE 101 is camped on the wireless cell 122a with limited service.

Figure 2:
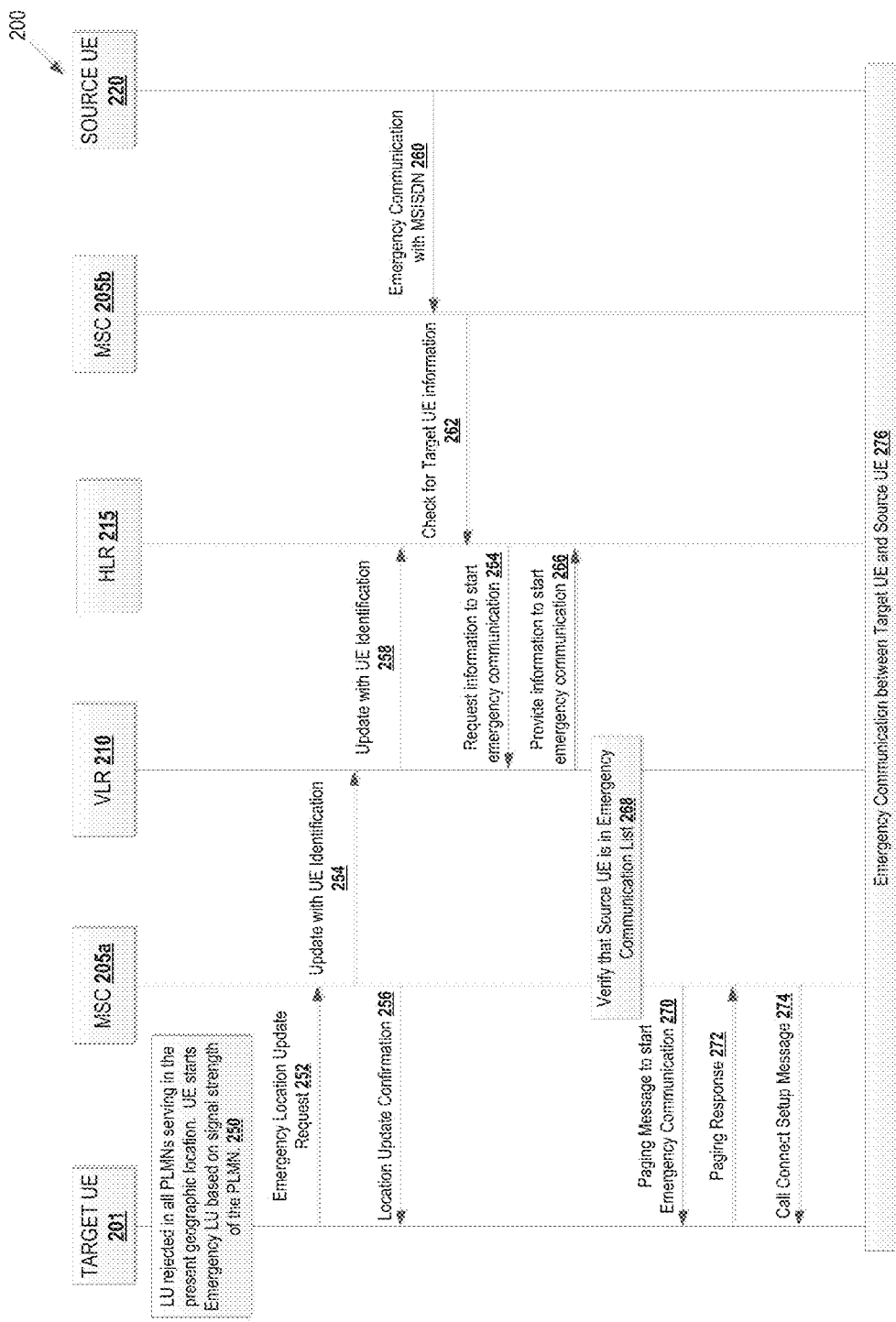
FIG. 2 is a sequence diagram illustrating the establishment of an emergency communication, in accordance with various embodiments.

Turning now to FIG. 2, a sequence diagram is shown illustrating the establishment of an emergency communication. In the context of FIG. 1, the target UE 201 may correspond to the UE 101, the visited MSC 205a may correspond to the MSC 108a, the VLR 210 may correspond to the VLR 109a, the HLR 215 may correspond to the HLR 107, the MSC 205b may correspond to the MSC 108b, and the source UE 220 may correspond to the UE 102. While some components are illustrated as communicating messages, for example, the MSC 205b and the source UE 220, there may be one or more intervening components to facilitate these exchanges, such as an BTS, a mobile management entity, and the like. In the illustrated embodiment, the target UE 201 may camp with limited service on a cell of a wireless network (not shown) provided by an BTS (not shown) controlled by the visited MSC 205*a*. Before camping with limited service, the target UE 201 may transmit one or more location update requests to attempt to camp with full service on another public land mobile network ("PLMN") (operation 250). However, a PLMN available to provide the target UE 201 with full service may be unavailable in the current geographic location of the target UE 201, and so the target UE 201 may receive one or more location update rejections in response to the one or more transmitted location update requests. Therefore, the target UE 201 may determine that it is unable to camp on a network with full service and, in response, determine on which network the target UE 201 is to camp based on, for example, the signal strength of each proximate PLMN. Here, the target UE 201 may determine that it is to camp on a network associated with the visited MSC 205*a*. In various embodiments, if the UE 201 is unable to find a suitable cell to camp on, a subscriber identity module ("SIM") is not inserted, or if the UE 201 receives a certain response to a location registration ("LR") request (e.g., "illegal UE"), then the UE 201 may attempt to camp on a cell irrespective of the PLMN identity and may enter the "limited service" state (e.g., in which the UE 201 may only attempt to establish emergency calls).

To camp with limited service on the network, the target UE 201 may generate an emergency location update request so that it may receive emergency communication even where the target UE 201 is camped on a network with limited service. The generated emergency location update request may include an identification of the target UE 201 and an indication that the target UE 201 is to receive emergency communication while camped on the network associated with the visited MSC 205*a*. The emergency location update request may then be transmitted to the visited MSC 205*a* associated with the network on which the target UE 201 is camped with limited service (operation 252).

Responsive to the emergency location update request, the visited MSC 205*a* may update the VLR 210 associated with the visited MSC 205*a*. The visited MSC 205*a* may update the associated VLR 210 with information associated with the target UE 201 (operation 254). In various embodiments, this information may include, for example, the identification of the target UE 201 (e.g., the identification from the received emergency location update request) and/or location information of the target UE 201 (e.g., a location area indicated in the received emergency location update request). Additionally, the update to the VLR 210 by the visited MSC 205*a* may include the indication that the target UE 201 is to receive emergency communication. In connection with the update to the VLR 210, the visited MSC 205*a* may transmit a location update confirmation to the target UE 201 so that the target UE 201 is aware of its ability to receive emergency communication (operation 256).

Based on the update to the associated VLR 210, the VLR 210 may transmit an update to the HLR 215 so that the target UE 201 may be located even where the target UE 201 is operating with limited service (operation 258). The HLR 215 may perform an update operation based on the update message from the MSC 205*a*. The update operation may include updating or creating a database entry that is associated with the target UE 201. In various embodiments, the update provided to the HLR 215 may include the identification of the target UE 201 (e.g., the identification from the emergency location update request) and/or location information of the target UE 201 (e.g., a location area indicated in the emergency location update request). Additionally, the update may include the indication that the target UE 201 is to receive emergency communication. With information about the target UE 201 registered in the core network, the target UE 201 may receive emergency communication through the core network even where the target UE 201 is operating with only limited service.

Subsequently, an emergency communication may be placed to the target UE 201. In the illustrated embodiment, the source UE 220 may initiate an emergency communication to the target UE 201 using an MSISDN of the target UE 201 (operation 260). The emergency communication may further include an MSISDN of the source UE. In one embodiment, the emergency communication may be a conversational call. Alternatively, the emergency communication may be a text message, such as a Short Message Service ("SMS") message or a Multimedia Message Service ("MMS") message.

The emergency communication initiated by the source UE 220 is received by the MSC 205*b*, which is associated with the location area in which the source UE 220 is located (e.g., a location area that may be different than the location area of the target UE 201). To determine how to process the emergency communication, the MSC 205*b* may check the HLR 215 for information associated with the target UE 201, such as location information (operation 262). In various embodiments, the MSC 205*b* may be outside of the core network that includes the HLR 215, and therefore additional components may be involved where the MSC 205*b* obtains information associated with the target UE 201. For example, the MSC 205*b* may use the MSISDN of the target UE 201 to locate a GMSC that is included in a same core network of the HLR 215, and the information associated with the target UE 201 may be routed through this GMSC.

In response to the check for information associated with the target UE 201, the HLR 215 may locate the database entry associated with the target UE 201. This located entry may indicate that the target UE is in the location area associated with the visited MSC 205*a* and VLR 210. Accordingly, the HLR 215 may request information associated with the target UE 201 so that the emergency communication may be routed (operation 264). This request may include the MSISDN of the target UE 201 and/or the MSISDN of the source UE 220.

In response to the request from the HLR 215, the VLR 210 may provide information associated with the target UE 201 to start the emergency communication (operation 266), such as routing information for the target UE 201 (e.g., a temporary mobile station roaming number). Further, the visited MSC 205*a* and/or the VLR 210 may determine that the source UE 220 is authorized to establish an emergency communication with the target UE 201. The visited MSC 205*a* may compare the MSISDN of the source UE 220 with an emergency communication list (e.g., a list of stored MSISDN values that exists at the visited MSC 205*a* and/or the VLR 210) (operation 268). If the MSISDN of the source UE 220 does not appear on the emergency communication list, the communication from the source UE 220 may be declined. In various embodiments, operations 266 and 268 may be transposed (e.g., the information associated with the target UE 201 to start the emergency communication may be provided to the HLR 215 only where it is first determined that the MSISDN of the source UE 220 appears in the emergency communication list).

Subsequently, the target UE 201 may be contacted by means of mobile-terminated paging from the network. Here, the emergency communication may be routed to the visited MSC 205*a*, at which point the visited MSC 205*a* transmits a paging message to the target UE 201 that identifies the target UE 201 and indicates that there is an emergency communication intended for the target UE 201 (operation 270). The target UE 201 may receive this paging message and respond to the visited MSC 205*a* with a paging response (operation 272). Based on the received paging response the visited MSC 205*a* may transmit a call connect setup message to the target UE 201 (operation 274). Consequently, the target UE 201 may alert a user of the target UE 201 that an emergency communication is inbound and, where the target UE 201 accepts the emergency communication, the emergency communication is established between the source UE 220 and the target UE 201 (operation 276).

Figure 3A:
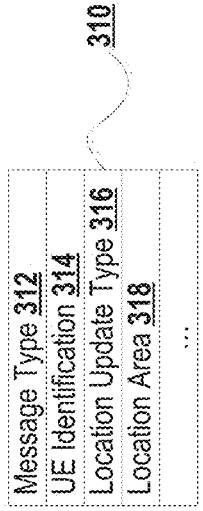
FIG. 3A is a block diagram illustrating an emergency location update request that may be transmitted by a UE to an MSC, in accordance with various embodiments.

Now with respect to FIG. 3A, an embodiment is shown of an emergency location update request 310 that may be transmitted by a UE to an MSC. In the context of FIG. 2, the emergency location update request 310 may be an embodiment of the emergency location update request transmitted by the target UE 201 to the visited MSC 205*a*. The emergency location update request 310 includes a plurality of fields 312-318, which may also be known as information elements. The emergency location update request 310 may include an indication of the message type 312. In various embodiments, this message type 312 may indicate that the emergency location update request 310 is a location update request, and therefore the value for the message type 312 may be the same as the value for any other location update request (e.g., a location update request transmitted for a network on which a UE may camp with full service).

In addition to the indication of the message type 312, the emergency location update request 310 may include, among other fields, a field for identification of the UE 314 to identify the UE that is transmitting the emergency location update request 310. This value in the field for the identification of the UE 314 may be, for example, an International Mobile Subscriber Identity ("IMSI") of the UE. In one embodiment, the identification of the UE 314 may be an International Mobile Station Equipment Identity ("IMEI"), such as where a subscriber identity module ("SIM") is absent from the UE. The value for the UE identification 314 may include a same value as any other location update request (e.g., a location update request transmitted for a network on which a UE may camp with full service).

To indicate that the location update request 310 is for emergency communication, the field for the location update type 316 may include a predetermined value associated with the emergency communication capability. Therefore, the indication of the location update type 316 may be a predetermined reserved value that is to be recognized by an MSC for registering a UE to receive emergency communication while the UE is camped on a network with limited service. In various embodiments, the value of the location update type 316 is different for the emergency location update request 310 than for other location update requests (e.g., location update requests for IMSI attach or a normal location update request transmitted for a network on which a UE may camp with full service).

The emergency location update request 310 may further include a field for a location area 318 to indicate the location area of the UE. The value for this location area 318 may be a code or other identifier that indicates one of the current location area and the previous location area of the UE. Another field, similar to the field for the location area 318, may be included in the request 310 to indicate the other of the current location area and the previous location area of the UE. In various embodiments, the emergency location update request 310 may include additional fields that are not illustrated herein, such as the name of a mobile management entity and/or a Temporary Mobile Subscriber Identity ("TMSI") status.

Figure 3B:
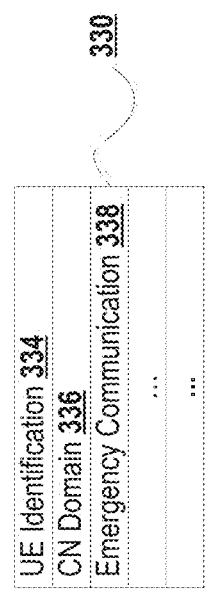
FIG. 3B is a block diagram illustrating a paging message that may be transmitted by an MSC to a UE for an emergency communication, in accordance with various embodiments.

With reference to FIG. 3B, an embodiment is shown of a paging message 330 that may be transmitted by an MSC to a UE for an emergency communication. In the context of FIG. 2, the paging message 330 may be an embodiment of the paging message transmitted by the visited MSC 205*a* to the target UE 201. The paging message 330 may include a plurality of fields 334-338, which may also be known as information elements. The paging message 330 may be broadcast by the MSC to a plurality of UEs including a target UE, and therefore to identify the target UE for which the paging message 330 is intended, the paging message 330 may include a field for UE identification 334. This value in the field for the identification of the UE 334 may be, for example, one of an IMSI, IMEI, or TMSI of the target UE.

The paging message 330 may further include a field for the core network ("CN") domain 336. The value for the core network domain 336 may indicate packet switched, if the paging message 330 is for data transfer or an incoming SMS, or circuit switched, if the paging message 330 is for an incoming circuit-switched conversational call. For example, an emergency communication that is a conversational call from an emergency service may compel a paging message with a value indicating circuit switched in the field for the core network domain 336.

Additionally, the paging message 330 may include a field that indicates an emergency communication 338. In one embodiment, this indication of an emergency communication 338 may include a Boolean value that indicates true when the paging message 330 is for an emergency communication and false otherwise. In another embodiment, this indication of an emergency communication 338 may be used for other indications as well, and therefore a predetermined value that is recognizable by the UE as indicative of an emergency communication may be inserted in this indication of an emergency communication 338 where the paging message 330 is for an emergency communication. In various embodiments, the paging message 330 may include additional fields that are not illustrated herein, such as a system information modification field and/or an earthquake and tornado warning system field.

Figure 4:
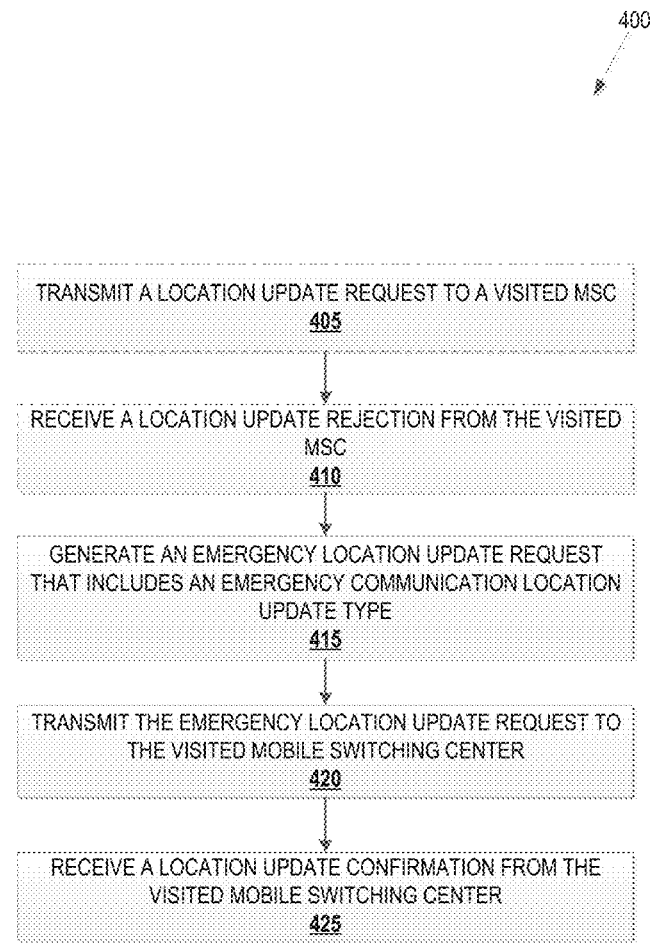
FIG. 4 is a flow diagram illustrating a method for transmitting a location update request to receive emergency communication, in accordance with various embodiments.

Turning to FIG. 4, a flow diagram depicts a method 400 for transmitting a location update request to receive emergency communication, in accordance with some embodiments. The method 400 may be performed by a UE that is camped with limited service on a network, such as the UE 101 shown in FIG. 1. While FIG. 4 illustrates a plurality of sequential operations, one of ordinary skill would understand that one or more operations of the method 400 may be transposed and/or performed contemporaneously.

As the method 400 may be performed by a UE, the performing UE may attempt to camp on a network. The performing UE may attempt to locate a network on which it may camp with full service by transmitting one or more location requests to one or more PLMNs that serve the current geographic location of the UE. Thus at operation 405, the method 400 begins with transmitting a location update request to a visited MSC. In various embodiments, the location update request may be a normal location update request that is transmitted so that a UE may camp with full service on a network. However, because the performing UE is not a subscriber of the network that includes the visited MSC, the method 400 includes an operation 410 of receiving a location update rejection from the visited MSC.

In some embodiments, a plurality of location update requests and associated rejections may be transmitted and received, respectively, by the UE. Where the UE has exhausted the PLMNs that serve the current geographic location of the UE, the UE may select a PLMN with a greatest signal strength to serve the UE in the geographic location. The UE may determine that this PLMN with the greatest signal strength is suitable to serve the UE in its current geographic location. The PLMN selected by the UE may be associated with an MSC—e.g., a visited MSC associated with a network on which the UE may only operate with limited service.

To operate on a network associated with the PLMN, an operation 415 of generating an emergency location update request may be included. The emergency location update request may be similar to a normal location update request, but may be adapted to indicate that the UE is to receive only emergency communications while operating with limited service on a network. For example, the emergency location update request may include an emergency communication location update type in a field that is to contain values for location type (e.g., an information element associated with location update type). This emergency communication location update type may be a predetermined value that is to indicate the UE is to receive only emergency communications while operating with limited service on a network.

With an emergency location update request generated, the method 400 includes an operation 420 for transmitting the emergency location update request to the visited MSC associated with the network on which the UE is to operate with limited service. The emergency location update request may not be transmitted directly to the visited MSC, but may reach the visited MSC through a plurality of components. Based on the transmitted emergency location update request, an operating 425 is performed of receiving a location update confirmation from the visited MSC. The reception of the confirmation indicates that the UE may operate on the network with limited service, but may still receive emergency communication.

Figure 5:
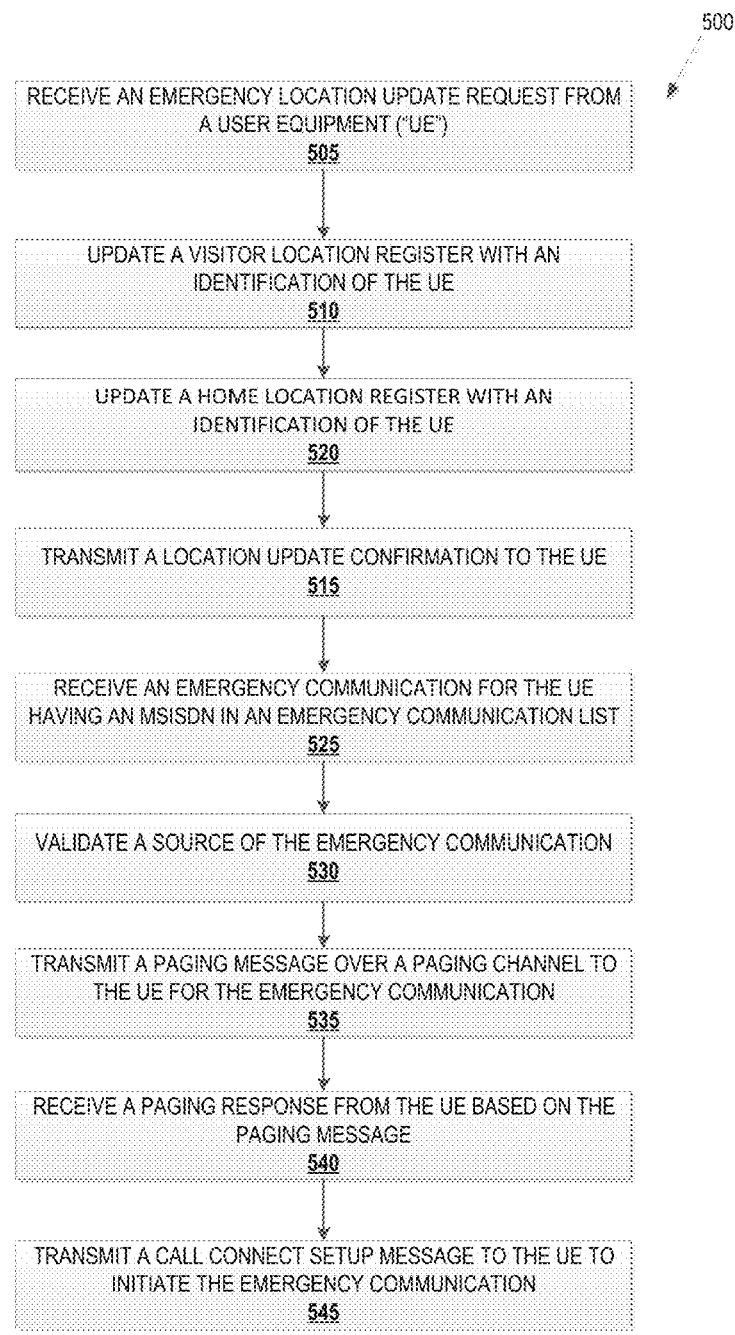
FIG. 5 is a flow diagram illustrating a method for facilitating emergency communication with a UE that is operating with limited service, in accordance with various embodiments.

With respect to FIG. 5, a flow diagram is shown illustrating a method 500 for facilitating emergency communication with a UE that is operating with limited service, in accordance with some embodiments. The method 500 may be performed by an MSC that is associated with a wireless network, such as the MSC 108a shown in FIG. 1. While FIG. 5 illustrates a plurality of sequential operations, one of ordinary skill would understand that one or more operations of the method 500 may be transposed and/or performed contemporaneously.

The method 500 may begin with a first operation 505 of receiving an emergency location update request from a target UE. The emergency location update request may include an indication that the target UE may operate on a network associated with the MSC with limited service, but may receive an emergency communication over this associated network. In various embodiments, the emergency location update request may indicate this functionality by including a predetermined value in a specific information element, such as an information element associated with the location update type.

Based on the received emergency location update request, the method 500 may proceed to an operation 510 of updating a VLR with an identification of the target UE. The identification of the target UE may be derived from the emergency location update request and, in various embodiments, may be an IMSI and/or TMSI of the target UE.

From the operation 510 of updating the VLR, the method 500 may further have an operation 515 of updating an HLR with the identification of the target UE. Accordingly, emergency communication may be routed to the target UE while the target UE is operating on the network with limited service, because such emergency communication may require an entry for the target UE in an HLR in order for the target UE to be addressed. The identification of the UE may be one or both of an IMSI and a TMSI associated with the target UE.

Based on the received emergency location request, the method 500 may include an operation 520 of transmitting a location update confirmation to the target UE. The location update confirmation may indicate to the target UE that the UE is capable of receiving emergency communication while operating on the network associated with the MSC.

With an entry for the target UE included in the HLR, emergency communication may be routed to the target UE. Accordingly, operation 525 shows an operation of receiving an emergency communication for the target UE. Because the target UE may only receive emergency communication while camped with limited service, the method 500 includes an operation 530 for validating the source (e.g., the source UE) of the emergency communication. According to one embodiment, a source UE attempting to establish the emergency communication must have an MSISDN that is included in an emergency communication list. The inclusion of the source UE's MSISDN in the emergency communication list indicates that the source UE is valid for establishing the emergency communication with the target UE. According to the embodiment, the source UE may be associated with an emergency service (e.g., police, force, firefighting force, emergency medical treatment force), although the source UE may alternatively be associated with a subscriber that is authorized to establish a communication with the target, such as where the subscriber associated with the source UE subscribes to a value-added service that allows for such communication. Thus, the MSISDN of the source UE may be associated with an emergency service, though it is contemplated that the MSISDN of the source UE may be associated with another subscriber. In various embodiments, the emergency communication list may be stored at a location that is accessible by the MSC and/or VLR so that the MSC and/or VLR may validate the MSISDN of the source UE before proceeding to any additional operations.

Where the MSISDN of the source UE appears in the emergency communication list, the method 500 may reach an operation 535. According to one embodiment, the operation 535 comprises transmitting a paging message over a paging channel to the target UE for the emergency communication. According to various embodiments, the paging message may be transmitted using a Paging Control Channel ("PCCH") logical channel, a Paging Channel ("PCH") transport channel, and a Physical Downlink Shared Channel ("PDSH") physical channel. This paging message may be broadcast to a plurality of UEs (including the UE) that are operating on the network associated with the MSC. To indicate that the paging message is intended for the target UE, the paging message may include an identification of the target UE (e.g., an IMSI or TMSI) in an information element. Additionally, the paging message may include an additional element that indicates that the paging message is for an emergency communication. This information element may be, for example, a flag or a predetermined value in an information element that may be used to indicate a plurality of paging message types. Where the emergency communication is for a conversational call, the paging message may include an information element that indicates that the paging message is for circuit-switched communication.

Based on the transmitted paging message, the method 500 may include the operation 540 of receiving a paging response from the target UE. The paging response received at operation 540 may indicate that the paging message has been detected and the UE is prepared to receive the emergency communication. Following the receipt of the paging response, the method 500 may continue to the operation 545 of transmitting a call connect setup message to the target UE to initiate the emergency communication. The target UE and the source UE may subsequently engage in the emergency communication (e.g., a mobile-terminated conversational call), such as where a user of the target UE has "answered" a conversational call by pressing a "Talk" button.

Figure 6:
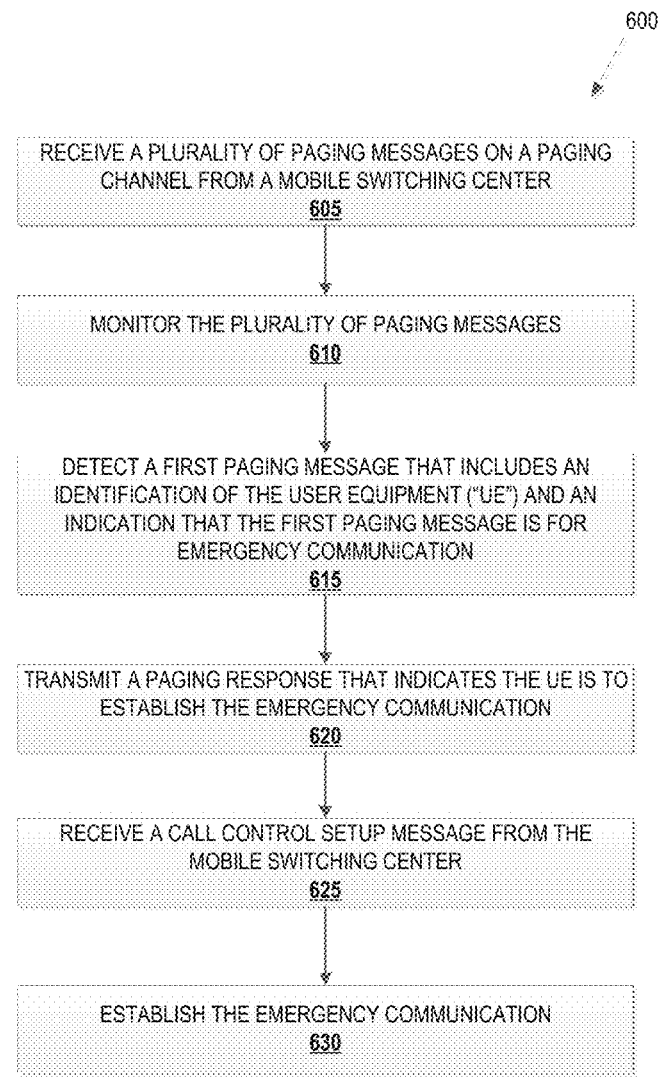
FIG. 6 is a flow diagram illustrating a method for establishing an emergency communication by a first UE with a second UE, in accordance with various embodiments.

Turning now to FIG. 6, a flow diagram depicts a method 600 for establishing an emergency communication by a first UE with a second UE, in accordance with some embodiments. The method 600 may be performed by a first UE that is camped with limited service on a network, such as the first UE 101 shown in FIG. 1. While FIG. 6 illustrates a plurality of sequential operations, one of ordinary skill would understand that one or more operations of the method 400 may be transposed and/or performed contemporaneously. According to some embodiments, the method 600 may be performed after a first UE has camped on a wireless network with limited service. For example, the first UE may have transmitted an emergency location update request to a visited MSC associated with the wireless network so that the first UE may receive emergency communication even where the first UE is camped with limited service. Thereafter, the first UE may camp on the wireless network in Radio Resource Control Idle mode.

Beginning with operation 605, the method 600 may include an operation of receiving a plurality of paging message on a paging channel from a visited MSC (e.g., an MSC that is associated with a wireless network on which the first UE is camped with limited service). In various embodiments, the paging channel may include a PCCH logical channel and a PCH transport channel, and the paging messages may be broadcast to a plurality of UEs that are camped on the wireless network associated with the visited MSC. As illustrated in operation 610, the method 600 may include an operation for monitoring the plurality of paging messages. According to one embodiment, the plurality of paging messages are monitored on the paging channel only once every Discontinuous Receive ("DRX") cycle.

In connection with the monitoring of the plurality of paging message, the method 600 may reach an operation 615 for the handling of paging messages. In an embodiment, operation 615 comprises detecting a first paging message that is intended for the first UE. At operation 615, the paging message may be detected as intended for the first UE based on an identification of the first UE that is included in a field of the paging message (e.g., an information element associated with an IMSI or TMSI of the first UE). Additionally, the paging message may include an indication that the paging message is for an emergency communication. For example, a flag may be set in a predetermined field (e.g., an "Emergency Communication Indicator" information element) or a predetermined value associated with emergency communication may be included in a field that may indicate a plurality of types of paging messages. In various embodiments, the paging message may include an indication that the emergency communication is circuit switched, such as where the emergency communication is a conversational call.

In response to the detected paging message for the first UE, the method 600 may include an operation 620 for transmitting a paging response that indicates that the first UE is to establish the emergency communication. Based on the paging response, the method 600 may proceed to an operation 625 of receiving a call control setup message from the visited MSC. In various embodiments, a user of the first UE may be alerted contemporaneously with the receipt of the call control setup message. At operation 630, the method 600 may include an operation for establishing the emergency communication. Where the emergency communication is a conversational call, the emergency communication may be established where, for example, a user of the first UE presses a "Talk" button to answer the conversational call.

Figure 7:
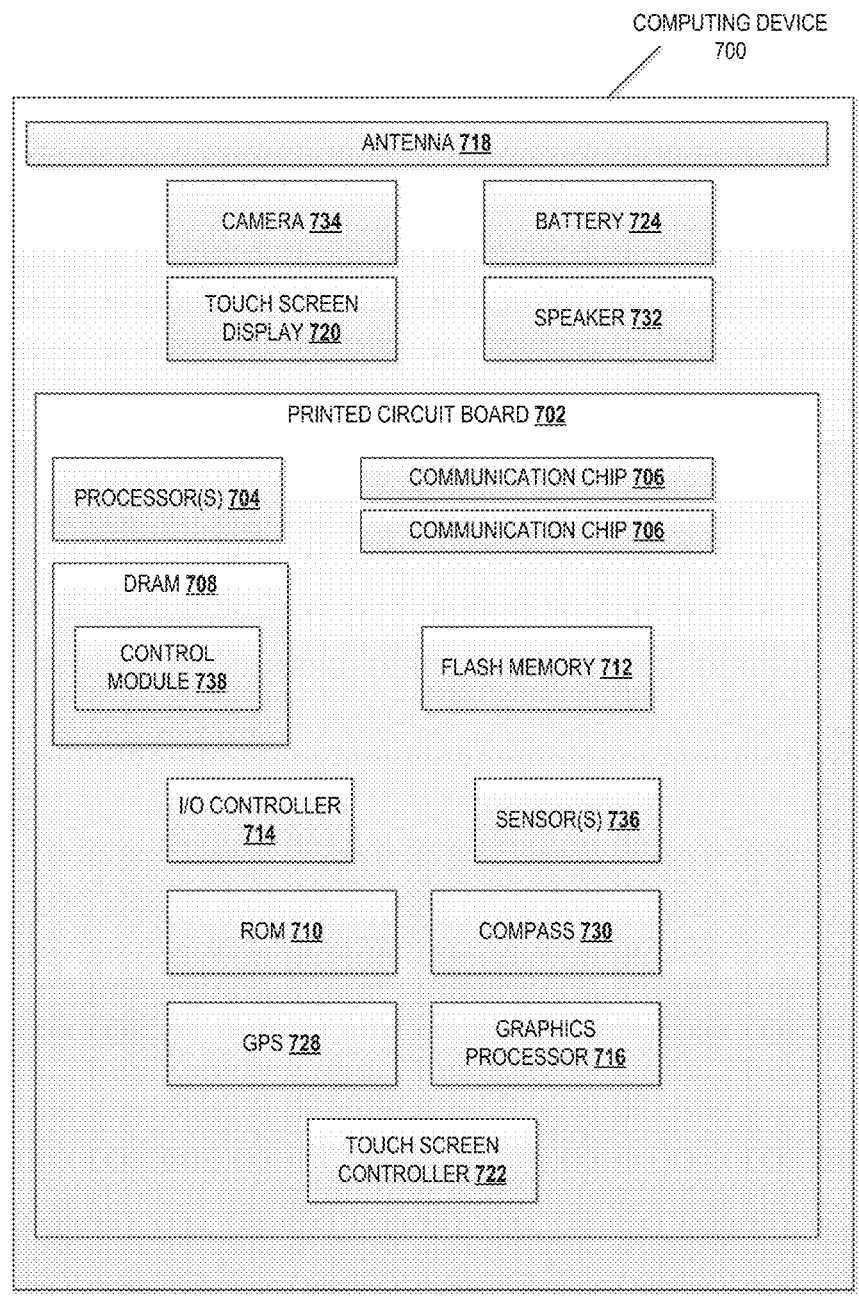
FIG. 7 is a block diagram of a computing device adapted to operate in a wireless communication network, in accordance to various embodiments.

With respect to FIG. 7, a block diagram illustrates an example computing device 700, in accordance with various embodiments. The UE 101, MSC 108a, and/or VLR 109a (which may be integrated with the MSC 108a) of FIG. 1 and described herein may be implemented on a computing device such as computing device 700. The computing device 700 may include a number of components, one or more processor 704 and at least one communication chips 706. Depending upon the embodiment, one or more of the enumerated components may comprise "circuitry" of the computing device 700, such as processing circuitry, communications circuitry, and the like. In various embodiments, the one or more processor(s) 704 each may be a processor core. In various embodiments, the at least one communication chips 706 may be physically and electrically coupled with the one or more processor 704. In further implementations, the communication chips 706 may be part of the one or more processor 704. In various embodiments, the computing device 700 may include a printed circuit board ("PCB") 702. For these embodiments, the one or more processors 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global positioning system ("GPS") or other satellite navigation device 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the processor 704 may be integrated on the same die with other components to form a system on a chip ("SOC").

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processors 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processors 704, enable the computing device 700 to operate one or more modules 738 configured to practice all or selected aspects of the data exchanges and method described herein, depending on the embodiment of the computing device 700 used to implement such data exchanges and methods.

The communication chips 706 may enable wired and/or wireless communications for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as Wi-Fi and Bluetooth, whereas a second communication chip 706 may be dedicated to longer range wireless communications, such as GPS, EDGE, GPRS, CDMA, WiMAX, LTE, LTE-A, Ev-DO, and the like.

In various implementations, the computing device 700 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 700 may be another other electronic device that processes data.

In various embodiments, example 1 may be an apparatus to be included in a UE. This apparatus may comprise processing circuitry to generate an emergency location update request that is to include an identification of the UE and an emergency location update type of the UE that indicates that the UE is to receive emergency communication in a current area. Further, this apparatus may comprise communications circuitry, communicatively coupled with the processing circuitry, to transmit the emergency location update request to a visited MSC associated with a visited network that serves a current area where the UE operates with limited service on the visited network. Example 2 may include the apparatus of example 1, wherein the identification of the UE is an IMSI or an IMEI. Example 3 may include the apparatus of any of examples 1 or 2, wherein the emergency location update type is a predetermined reserved value that is to be recognized by the visited MSC for registering the UE to receive emergency communication in the current area. Example 4 may include the apparatus of any of examples 1 to 2, wherein the communications circuitry is further to receive a location update confirmation from the visited MSC in response to the emergency location update request, the location update confirmation to indicate that the UE can be paged for emergency communication in the current area. Example 5 may include the apparatus of any of examples 1 to 2, wherein the communications circuitry is further to transmit a first location update request that does not include the emergency location update type to the visited MSC, to receive a location update rejection that indicates the visited MSC did not register the UE, and wherein the emergency location update request that includes the emergency location update type of the UE is transmitted based on the reception of the location update rejection.

Example 6 may be an MSC comprising communications circuitry and processing circuitry communicatively coupled with the communications circuitry. The communications circuitry may be adapted to receive an emergency location update request from a UE operating with limited service on a wireless network that is associated with the MSC, the emergency location update request to include an identification of the UE and an emergency location update type that indicates that the UE is to receive emergency communication over the wireless network, and to transmit to the UE a location update confirmation. The processing circuitry may be adapted to update a visitor location register VLR with the identification of the UE based on the emergency location update type that indicates that the UE is to receive emergency communication. Example 7 may include the MSC of example 6, wherein the communications circuitry is to transmit the location update confirmation to the UE based on the update to the VLR with the identification of the UE. Example 8 may include the MSC of any of examples 6 or 7, wherein the identification of the UE is an IMSI, a TMSI, or an IMEI. Example 9 may include the MSC of any of examples 6 to 7, wherein the communications circuitry is further to receive a source MSISDN based on a mobile-originated call; and the processing circuitry is further to determine whether the source MSISDN is included in an emergency communication list having a plurality of MSISDNs that are authorized to establish emergency communication with the UE. Example 10 may include the MSC of any of examples 6 to 7, wherein the update to the VLR is to cause a home location register ("HLR") to be updated with the identification of the UE based on the emergency location update type that indicates that the UE is to receive emergency communication. Example 11 may include the MSC of example 9, wherein the communications circuitry is further to transmit to the UE, where the source MSISDN is included in the emergency communication list, a paging message, the paging message having information elements that indicate the identification of the UE, a core network domain is circuit-switched, and the paging message is for a mobile-terminated emergency communication. Example 12 may include the MSC of example 11, wherein the communications circuitry is further to receive a paging response from the UE based on the transmitted paging message and to transmit, to the UE, a call connect setup message to initiate the mobile-terminated emergency communication based on the paging response. Example 13 may include the MSC of example 11, wherein the communications circuitry is to transmit the paging message to the UE using a PCCH logical channel, a PCH transport channel, and a PDSH physical channel.

In various embodiments, example 14 may be an apparatus to be included in a UE having communications circuitry and processing circuitry communicatively coupled with the communications circuitry. The communications circuitry may be adapted to receive a plurality of paging messages on a paging channel from an MSC associated with a visited network that serves a current area in which the UE is located where the UE operates with limited service on the visited network. The processing circuitry may be adapted to monitor the plurality of paging messages received on the paging channel and to detect a first paging message that includes an identification of the UE and an indication that the first paging message is for an emergency communication. Example 15 may include the apparatus of example 14, wherein the communications circuitry is further to transmit, to the MSC, a paging response that indicates the paging response is to establish the emergency communication based on the detected first paging message. Example 16 may include the apparatus of either example 14 or example 15, wherein the emergency communication originated from an emergency service that is at least one of a police force, a firefighting force, and an emergency medical treatment force or a value-added service for a subscriber. Example 17 may include the apparatus of any of examples 14 to 15, wherein the communications circuitry is further to receive, from the MSC, a call control setup message to initiate the emergency communication; and the processing circuitry is to establish the emergency communication based on the call control setup message. Example 18 may include the apparatus of any of examples 14 to 15, wherein the emergency communication is a conversational call. Example 19 may include the apparatus of any of examples 14 to 15, wherein the processing circuitry is further to operate in Radio Resource Control Idle mode based on the limited service on the visited network and is to monitor the plurality of messages received on the paging channel once every Discontinuous Receive cycle. Example 20 may include the apparatus of any of examples 14 to 15, wherein the paging channel includes a PCCH logical channel and a PCH transport channel.

In various embodiments, example 21 may be a non-transitory computing device-readable medium comprising computing device-executable instructions included in UE. In response to execution by a computing device, the instructions may cause the computing device to transmit, to an MSC associated with a network that serves a current area, an emergency location update request that includes an identification of the UE and an emergency location update type of the UE that indicates that the UE is to receive mobile-terminated emergency communication in the current area, where the UE is operating with limited service on the network; to receive, from the MSC associated with the network, a plurality of paging messages on a paging channel based on operating on the network; to monitor the plurality of paging messages received on the paging channel; and to detect a first paging message of the plurality of received paging messages that includes an identification of the UE and an indication that the first paging message is for the mobile-terminated emergency communication. Example 22 may include the non-transitory computing device-readable medium of example 21, wherein the identification of the UE is an IMSI or an IMEI and the emergency location update type is a predetermined reserved value that is to be recognized by the MSC for registering the UE to receive emergency communication in the current area through the network. Example 23 may include the non-transitory computing device-readable medium of example 21 or example 22, wherein the instructions are further to cause the computing device to receive a location update confirmation from the MSC included in the network based on the emergency location update request, the location update confirmation to indicate that the UE can receive the mobile-terminated emergency communication in the current area. Example 24 may include the non-transitory computing device-readable medium of any of examples 21 to 22, wherein the instructions are further to cause the computing device to operate in Radio Resource Control Idle mode and to monitor the plurality of messages received on the paging channel once every Discontinuous Receive cycle. Example 25 may include the non-transitory computing device-readable medium of any of examples 21 to 22, wherein the instructions are further to cause the computing device to transmit, to the MSC, a paging response based on the detected first paging message; to receive, from the MSC, a call control setup message to initiate the mobile-terminated emergency communication based on the paging response; and to establish the mobile-terminated emergency communication based on the call control setup message.

In various embodiments, example 26 may be a computer-implemented method for performing an emergency location update, the method comprising: generating an emergency location update request that is to include an identification of a user equipment ("UE") and an emergency location update type of the UE that indicates that the UE is to receive emergency communication in a current area; and transmitting the emergency location update request to a visited mobile switching center ("MSC") associated with a visited network that serves a current area where the UE operates with limited service on the visited network. Example 27 may include the method of example 26, wherein the identification of the UE is an International Mobile Subscriber Identity ("IMSI") or an International Mobile Station Equipment Identity ("IMEI"). Example 28 may include the method of any of examples 26-27, wherein the emergency location update type is a predetermined reserved value that is to be recognized by the visited MSC for registering the UE to receive emergency communication in the current area. Example 29 may include the method of any of examples 26-27, the method further comprising: receiving a location update confirmation from the visited MSC in response to the emergency location update request, the location update confirmation to indicate that the UE can be paged for emergency communication in the current area.

In various embodiments, example 30 may be a system to be included in a mobile switching center ("MSC") for performing an emergency location update, the system comprising: at least one processor; and at least one memory having processor-executable instructions that, in response to execution by the at least one processor, cause the system to: receive an emergency location update request from a user equipment ("UE") operating with limited service on a wireless network that is associated with the MSC, the emergency location update request to include an identification of the UE and an emergency location update type that indicates that the UE is to receive emergency communication over the wireless network; update a visitor location register ("VLR") with the identification of the UE based on the emergency location update type that indicates that the UE is to receive emergency communication; and transmit to the UE a location update confirmation. Example 31 may include the system of example 30, wherein the location update confirmation is to be transmitted to the UE based on the update to the VLR with the identification of the UE. Example 32 may include the system of any of examples 30-31, wherein the identification of the UE is an International Mobile Subscriber Identity ("IMSI"), a Temporary Mobile Subscriber Identity ("TMSI"), or an International Mobile Station Equipment Identity ("IMEI"). Example 33 may include the system of any of examples 30-31, wherein the instructions that, in response to execution by the at least one processor, are further to cause the system to: receive a source Mobile Subscriber Integrated Services Digital Network-Number ("MSISDN") based on a mobile-originated call; and determine whether the source MSISDN is included in an emergency communication list having a plurality of MSISDNs that are authorized to establish emergency communication with the UE. Example 34 may include the system of any of examples 30-31, wherein the update to the VLR is to cause a home location register ("HLR") to be updated with the identification of the UE based on the emergency location update type that indicates that the UE is to receive emergency communication.

Example 35 may be a non-transitory computing device-readable medium comprising computing device-executable instructions for performing an emergency location update associated with a user equipment ("UE"), wherein the instructions, in response to execution by a computing device, cause the computing device to: receive a plurality of paging messages on a paging channel from a mobile switching center ("MSC") associated with a visited network that serves a current area in which the UE is located where the UE operates with limited service on the visited network; monitor the plurality of paging messages received on the paging channel; and detect a first paging message that includes an identification of the UE and an indication that the first paging message is for an emergency communication. Example 36 may include the non-transitory computing device-readable medium of example 35, wherein the instructions, in response to execution by the computing device, further cause the computing device to: transmit, to the MSC, a paging response that indicates the paging response is to establish the emergency communication based on the detected first paging message. Example 37 may include the non-transitory computing device-readable medium of any of examples 35-36, wherein the emergency communication originated from an emergency service that is at least one of a police force, a firefighting force, and an emergency medical treatment force or a value-added service for a subscriber. Example 38 may include the non-transitory computing device-readable medium of any of examples 35-36, wherein the instructions, in response to execution by the computing device, further cause the computing device to: receive, from the MSC, a call control setup message to initiate the emergency communication; and establish the emergency communication based on the call control setup message. Example 39 may include the non-transitory computing device-readable medium of any of examples 35-36, wherein the emergency communication is a conversational call. Example 40 may include the non-transitory computing device-readable medium of any of claims 35-36, wherein the paging channel includes a Paging Control Channel ("PCCH") logical channel and a Paging Channel ("PCH") transport channel.

In various embodiments, example 41 may be an apparatus to be included in a user equipment ("UE"), the apparatus comprising: means for transmitting, to a mobile switching center ("MSC") associated with a network that serves a current area, an emergency location update request that includes an identification of the UE and an emergency location update type of the UE that indicates that the UE is to receive mobile-terminated emergency communication in the current area, where the UE is operating with limited service on the network; means for receiving, from the MSC associated with the network, a plurality of paging messages on a paging channel based on operating on the network; means for monitoring the plurality of paging messages received on the paging channel; and means for detecting a first paging message of the plurality of received paging messages that includes an identification of the UE and an indication that the first paging message is for the mobile-terminated emergency communication. Example 42 may include the apparatus of example 41, wherein the identification of the UE is an International Mobile Subscriber Identity ("IMSI") or an International Mobile Station Equipment Identity ("IMEI") and the emergency location update type is a predetermined reserved value that is to be recognized by the MSC for registering the UE to receive emergency communication in the current area through the network. Example 43 includes the apparatus of any of examples 41-42, the apparatus further comprising: means for receiving a location update confirmation from the MSC included in the network based on the emergency location update request, the location update confirmation to indicate that the UE can receive the mobile-terminated emergency communication in the current area. Example 44 may include the apparatus of any of examples 41-42, the apparatus further comprising: means for operating in Radio Resource Control Idle mode; and means for monitoring the plurality of messages received on the paging channel once every Discontinuous Receive cycle. Example 45 may include the apparatus of any of examples 41-22, the apparatus further comprising: means for transmitting, to the MSC, a paging response based on the detected first paging message; means for receiving, from the MSC, a call control setup message to initiate the mobile-terminated emergency communication based on the paging response; and means for establishing the mobile-terminated emergency communication based on the call control setup message.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
   processing circuitry to generate an emergency location update request that is to include an identification of the UE and an emergency location update type of the UE that indicates that the UE is to receive emergency communication in a current area in which the UE is to camp with limited service on a visited network; and
   communications circuitry, communicatively coupled with the processing circuitry, to:
      transmit the emergency location update request to a visited mobile switching center ("MSC"), wherein the visited MSC is part of the visited network that serves the current area where the UE is to camp with limited service on the visited network; and
      when the UE camps with limited service on the visited network, receive a paging message, wherein the paging message includes a first information element ("IE") that indicates the paging message is for a mobile-terminated emergency communication and a second IE that indicates a core network domain of the visited network, wherein the core network domain is a packet switched domain or a circuit switched domain; and
      receive the mobile-terminated emergency communication as a text message when the second IE indicates that the core network domain is the packet switched domain, or receive the mobile-terminated emergency communication as a conversational call when the second IE indicates that the core network domain is the circuit switched domain.

2. The apparatus of claim 1, wherein the identification of the UE is an International Mobile Subscriber Identity ("IMSI") or an International Mobile Station Equipment Identity ("IMEI").

3. The apparatus of claim 1, wherein the emergency location update type is a predetermined reserved value that is to be recognized by the visited MSC for registering the UE to receive emergency communication in the current area.

4. The apparatus of claim 1, wherein the communications circuitry is further to:
   receive a location update confirmation from the visited MSC in response to the emergency location update request, wherein the location update confirmation is to indicate that the UE can be paged for emergency communication in the current area.

5. The apparatus of claim 1, wherein the communications circuitry is further to:
   transmit a first location update request that does not include the emergency location update type to the visited MSC; and
   receive a location update rejection that indicates the visited MSC did not register the UE, and
   wherein the emergency location update request that includes the emergency location update type of the UE is transmitted based on the reception of the location update rejection.

6. A mobile switching center ("MSC"), the MSC comprising:
   communications circuitry to:
      receive an emergency location update request from a target user equipment ("UE") operating with limited service on a wireless network that includes the MSC, the emergency location update request to include an identification of the target UE and an emergency location update type that indicates that the target UE is to receive emergency communication over the wireless network,
      transmit, to the target UE, a location update confirmation,
      transmit, to the target UE, a paging message, wherein the paging message includes an information element that indicates that the paging message is for a mobile-terminated emergency communication,
      receive, from a source UE, the mobile-terminated emergency communication, and
      transmit, to the target UE, the mobile-terminated emergency communication when the source UE is verified as permitted to establish mobile-terminated emergency communications; and
   processing circuitry, communicatively coupled with the communications circuitry, to:
      control storage, in a visitor location register ("VLR"), of the identification of the target UE based on the emergency location update type that indicates that the target UE is to receive emergency communication,
      route the paging message and a mobile-terminated emergency call to the target UE based on the identification of the target UE stored in the VLR,
      identify a source Mobile Subscriber Integrated Services Digital Network-Number ("MSISDN") of the source UE, and verify, using the source MSISDN, that the source UE is permitted to establish the mobile-terminated emergency communication with the target UE, wherein to verify that the source UE is permitted to establish the mobile-terminated emergency communication with the target UE, the processing circuitry is to determine whether the source MSISDN is included in an emergency communication list having a plurality of MSISDNs that are authorized to establish emergency communications with the target UE.

7. The MSC of claim 6, wherein the communications circuitry is to transmit the location update confirmation to the target UE based on the update to the VLR with the identification of the target UE.

8. The MSC of claim 6, wherein the identification of the target UE is an International Mobile Subscriber Identity ("IMSI"), a Temporary Mobile Subscriber Identity ("TMSI"), or an International Mobile Station Equipment Identity ("IMEI").

9. The MSC of claim 6, wherein the update to the VLR is to cause a home location register ("HLR") to be updated with the identification of the target UE based on the emergency location update type that indicates that the target UE is to receive emergency communication.

10. The MSC of claim 6, wherein the information element is a first information element, and when the source MSISDN is included in the emergency communication list, the paging message is to include a second information element that is to indicate whether a core network domain is a packet switched domain or a circuit switched domain, and the paging message is to include a third information element that is to indicate the identification of the source UE.

11. The MSC of claim 10, wherein the communications circuitry is further to:
receive a paging response from the target UE based on the transmitted paging message; and
transmit, to the target UE, a call connect setup message to initiate the mobile-terminated emergency communication based on the paging response.

12. The MSC of claim 10, wherein the communications circuitry is to transmit the paging message to the target UE using a Paging Control Channel ("PCCH") logical channel, a Paging Channel ("PCH") transport channel, and a Physical Downlink Shared Channel ("PDSH") physical channel.

13. An apparatus to be included in a user equipment ("UE"), the apparatus comprising:
communications circuitry to receive a plurality of paging messages on a paging channel from a visited mobile switching center ("MSC") when the UE camps with limited service on a visited network, wherein the visited network serves a current area in which the UE is located, and wherein the visited MSC is part of the visited network; and
processing circuitry, communicatively coupled with the communications circuitry, to monitor the plurality of paging messages received on the paging channel and to detect a first paging message, wherein the first paging message includes a first information element ("IE") that includes an identification of the UE, a second IE that indicates a core network domain of the visited network, wherein the core network domain is a packet switched domain or a circuit switched domain, and a third IE that indicates that the first paging message is for an emergency communication; and
wherein the communications circuitry is to receive the emergency communication as a text message when the second IE indicates that the core network domain is the packet switched domain, or receive the emergency communication as a conversational call when the second IE indicates that the core network domain is the circuit switched domain.

14. The apparatus of claim 13, wherein
the communications circuitry is further to transmit, to the visited MSC, a paging response that indicates that the paging response is for establishment of the emergency communication based on the detected first paging message.

15. The apparatus of claim 13, wherein the emergency communication is obtained from a UE of an emergency service provider that is at least one of a police force, a firefighting force, and an emergency medical treatment force or a value-added service for a subscriber.

16. The apparatus of claim 13, wherein
the communications circuitry is further to receive, from the visited MSC, a call control setup message to initiate the emergency communication; and
the processing circuitry is to establish the emergency communication based on the call control setup message.

17. The apparatus of claim 13, wherein
the processing circuitry is further to operate in Radio Resource Control Idle mode based on the limited service on the visited network and is to monitor the plurality of messages received on the paging channel once every Discontinuous Receive cycle.

18. The apparatus of claim 13, wherein the paging channel includes a Paging Control Channel ("PCCH") logical channel and a Paging Channel ("PCH") transport channel.

19. A non-transitory computing device-readable medium comprising computing device-executable instructions included in a user equipment ("UE"), wherein the instructions, in response to execution by a computing device, cause the computing device to:
transmit, to a visited mobile switching center ("MSC") of a visited network that serves a current area in which the UE is located, an emergency location update request that includes an identification of the UE and an emergency location update type of the UE, wherein the emergency location update type indicates that the UE is to receive mobile-terminated emergency communication in the current area, and wherein the UE is to camp on the visited network with limited service;
receive, from the visited MSC, a plurality of paging messages on a paging channel based on operation on the visited network;
monitor the plurality of paging messages received on the paging channel;
detect a first paging message of the plurality of received paging messages, wherein the first paging message includes a first information element ("IE") that includes an identification of the UE, a second IE that indicates a core network domain of the visited network, wherein the core network domain is a packet switched domain or a circuit switched domain, and a third IE that indicates that the first paging message is for the mobile-terminated emergency communication; and
receive the mobile-terminated emergency communication as a text message when the second IE indicates that the core network domain is the packet switched domain, or receive the mobile-terminated emergency communication as a conversational call when the second IE indicates that the core network domain is the circuit switched domain.

20. The non-transitory computing device-readable medium of claim 19, wherein the identification of the UE is an International Mobile Subscriber Identity ("IMSI") or an International Mobile Station Equipment Identity ("IMEI"), and the emergency location update type is a predetermined reserved value that is to be recognized by the visited MSC for registration of the UE to receive emergency communication in the current area through the network.

21. The non-transitory computing device-readable medium of claim 19, wherein the instructions are to cause the computing device to receive a location update confirmation from the visited MSC included in the visited network based on the emergency location update request, wherein the location update confirmation is to indicate that the UE can receive the mobile-terminated emergency communication in the current area.

22. The non-transitory computing device-readable medium of claim 19, wherein the instructions are to cause the computing device to operate in Radio Resource Control Idle mode and to monitor the plurality of messages received on the paging channel once every Discontinuous Receive cycle.

23. The non-transitory computing device-readable medium of claim 19, wherein the instructions are further to cause the computing device to:
 transmit to the visited MSC, a paging response based on the detected first paging message;
 receive, from the visited MSC, a call control setup message to initiate the mobile-terminated emergency communication based on the paging response; and
 establish the mobile-terminated emergency communication based on the call control setup message.

* * * * *